US010967824B1

(12) United States Patent
Pertsel et al.

(10) Patent No.: US 10,967,824 B1
(45) Date of Patent: Apr. 6, 2021

(54) SITUATIONAL IMPACT MITIGATION USING COMPUTER VISION

(71) Applicant: Ambarella International LP, Santa Clara, CA (US)

(72) Inventors: Shimon Pertsel, Mountain View, CA (US); Patrick Martin, Rochester, MI (US)

(73) Assignee: Ambarella International LP, Santa Clara, CA (US)

(*) Notice: Subject to any disclaimer, the term of this patent is extended or adjusted under 35 U.S.C. 154(b) by 131 days.

(21) Appl. No.: 15/965,891

(22) Filed: Apr. 28, 2018

Related U.S. Application Data

(60) Provisional application No. 62/653,008, filed on Apr. 5, 2018.

(51) Int. Cl.
| | |
|---|---|
| *G08G 1/16* | (2006.01) |
| *B60R 21/00* | (2006.01) |
| *B60R 21/015* | (2006.01) |
| *G06K 9/00* | (2006.01) |
| *G06N 5/04* | (2006.01) |
| *B60R 21/0134* | (2006.01) |

(52) U.S. Cl.
CPC .... *B60R 21/01538* (2014.10); *B60R 21/0134* (2013.01); *G06K 9/00362* (2013.01); *G06K 9/00805* (2013.01); *G06K 9/00832* (2013.01); *G06N 5/046* (2013.01)

(58) Field of Classification Search
None
See application file for complete search history.

(56) References Cited

U.S. PATENT DOCUMENTS

| | | | | |
|---|---|---|---|---|
| 2008/0260239 | A1* | 10/2008 | Han | G06K 9/4614 382/156 |
| 2018/0225971 | A1* | 8/2018 | Foltin | B60T 7/22 |
| 2019/0225232 | A1* | 7/2019 | Blau | B60W 50/0098 |

OTHER PUBLICATIONS

Ren, Shaoqing, et al., "Faster R-CNN: Towards Real-Time Object Detection With Region Proposal Networks", arXiv preprint arXiv:1506.01497v3 [cs.CV], Jan. 6, 2016, 14 pages.
Girshick, Ross, "Fast R-CNN", arXiv: 150408083v2 [cs.CV], Sep. 27, 2015, 9 pages.

(Continued)

*Primary Examiner* — Adam D Tissot
(74) *Attorney, Agent, or Firm* — Christopher P. Maiorana, PC

(57) ABSTRACT

An apparatus includes a first capture device, a second capture device and a processor. The first capture device may generate a first plurality of video frames corresponding to an interior view of a vehicle. The second capture device may generate a second plurality of video frames corresponding to an area outside of the vehicle. The processor may be configured to perform operations to detect objects in the video frames, detect occupants of the vehicle based on the objects detected in the first video frames, determine whether a potential collision is unavoidable based on the objects detected in the second video frames and select a reaction if the potential collision is unavoidable. The reaction may be selected to protect occupants determined to be vulnerable based on characteristics of the occupants. The characteristics may be determined by performing the operations on each of the occupants.

20 Claims, 14 Drawing Sheets

(56) References Cited

OTHER PUBLICATIONS

Dai, Jifeng et al., "Instance-Aware Semantic Segmentation via Multi-Task Network Cascades", IEEE Conference on Computer Vision and Pattern Recognition (CVPR), 2016, pp. 3150-3158.

Ujjwalkarn, "An intuitive Explanation of Convolutional Neural Networks", https://ujjwalkarn.me/2016/08/11/intuitive-explanation-convnets/, The Data Science Blog, Aug. 11, 2016, 16 pages.

Daniel Smilkov et al., "A Neural Network Playground",http://playground.tensorflow.org, Mar. 10, 2016, 2 pages.

* cited by examiner

US 10,967,824 B1

SITUATIONAL IMPACT MITIGATION USING COMPUTER VISION

This application relates to U.S. Provisional Application No. 62/653,008, filed Apr. 5, 2018, which is hereby incorporated by reference in its entirety.

FIELD OF THE INVENTION

The invention relates to computer vision generally and, more particularly, to a method and/or apparatus for implementing situational impact mitigation using computer vision.

BACKGROUND

Air bags save lives. Air bags can also cause significant harm to occupants (i.e., small children in the front seat, babies, passengers with feet on the dashboard, etc.). Without knowledge of occupants within the vehicle, air bag deployment cannot be adjusted to account for various traits and/or conditions of different occupants.

In some circumstances, an impact may be unavoidable. Even when an impact is unavoidable, the damage caused by the impact can be mitigated. Without knowledge of occupants within the vehicle, the damage cannot be mitigated to protect the occupants based on the situation.

It would be desirable to implement situational impact mitigation using computer vision.

SUMMARY

The invention concerns an apparatus including a first capture device, a second capture device and a processor. The first capture device may be configured to generate a first plurality of video frames corresponding to an interior view of a vehicle. The second capture device may be configured to generate a second plurality of video frames corresponding to an area outside of the vehicle. The processor may be configured to perform operations to detect objects in the first video frames and the second video frames, detect occupants of the vehicle based on the objects detected in the first video frames, determine whether a potential collision is unavoidable based on the objects detected in the second video frames and select a reaction if the potential collision is unavoidable. The reaction may be selected to protect occupants determined to be vulnerable based on characteristics of the occupants. The characteristics may be determined by performing the operations on each of the occupants.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing situational impact mitigation using computer vision that may (i) utilize interior and exterior cameras of a vehicle, (ii) mitigate damage resulting from crashes, (iii) adjust how a car collides, (iv) protect vulnerable passengers in an impact scenario, (v) determine characteristics of occupants of a vehicle, (vi) implement fleet learning to train a convolutional neural network, (vii) utilize computer vision with sensor fusion and/or (viii) be implemented as one or more integrated circuits.

Embodiments of the present invention may utilize interior cameras, exterior cameras and communication systems of vehicles (e.g., 3G, 4G, LTE, 5G, etc.). The present invention may implement computer vision to determine information about the interior and/or exterior of a vehicle. Using computer vision, embodiments of the present invention may classify and/or determine characteristics of occupants of a vehicle. In an example of an unavoidable crash scenario into a static object (e.g., wall, tree, lamp post, etc.), if some of the seats are determined to be unoccupied then how the car reacts before crashing may be adjusted to manage the damage caused by the impact (e.g., the vehicle may swerve to expose the unoccupied seat to the impact). In another example, if the computer vision determines that one or more of the occupants is considered "vulnerable" (e.g., a child, pregnant woman, passenger with feet on the dashboard, etc.) safety measures such as air bags may be deployed in a manner to protect the vulnerable passenger (e.g., the air bag deployment may account for characteristics of the occupant (e.g., a size, weight, gender, body position, etc.)).

Figure 1:
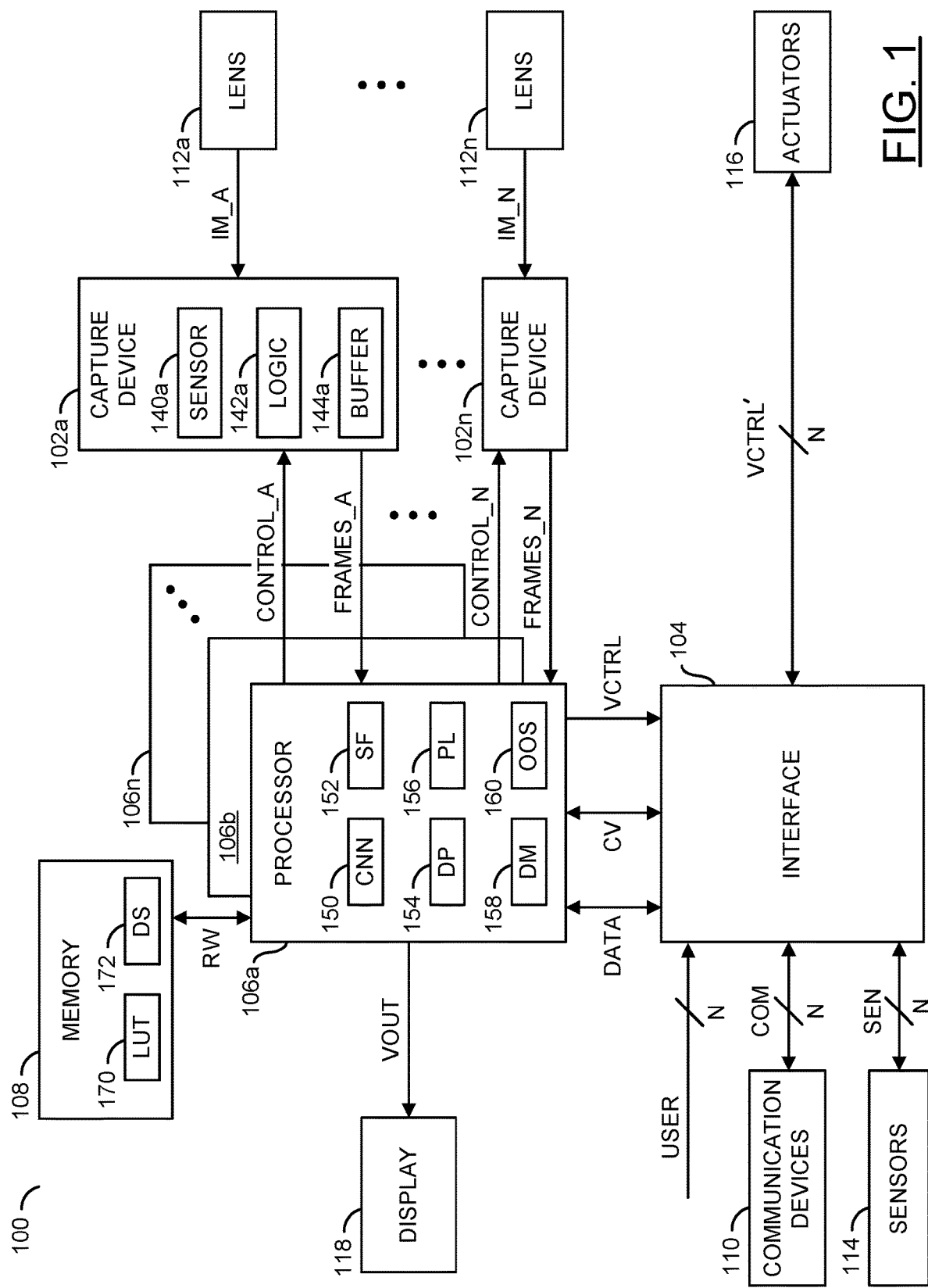
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or a block (or circuit) 118. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuit 118 may implement a display. The apparatus 100 may comprise other components (not shown). The number, type and/or arrangement of the components of the apparatus 100 may be varied according to the design criteria of a particular implementation.

In various embodiments of the apparatus 100, the components 102a-118 may be implemented as a distributed camera system 100. In the distributed system embodiment of the apparatus 100, each component may be implemented separately throughout an installation location (e.g., such as a vehicle). In some embodiments of the apparatus 100, the components 102a-118 may be implemented on a printed circuit board (e.g., a single module). In the single module embodiment, each component may be connected to a single module (e.g., such as a circuit board on a small device such as a drone). In some embodiments, some of the components 102a-118 may be implemented on a single module and some of the components 102a-118 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle).

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118 may be implemented as part of another one of the components 102a-118. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., the display 118).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 60a-60n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, a signal (e.g., VOUT) and/or send/receive the signal DATA, the signal CV and/or a signal (e.g., RW). The signal VOUT may provide a video data output to the display 118. The signal RW may communicate data to/from the memory 108. The signal VOUT, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170 and/or a block (or circuit) 172. The block 170 may implement a look up table. The block 172 may implement data storage. The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The display 118 may be a screen and/or an output device. In one example, the display 118 may implement an electronic mirror (e.g., an e-mirror). In another example, the display 118 may implement a touchscreen for an infotainment system. In yet another example, the display 118 may implement a back-up camera and/or bird's eye view camera. The display 118 may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118. For example, the processor 106a-106n may provide real-time video streaming to the display 118 via the signal VOUT.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 5.

The sensor fusion module 152 may be configured to analyze information from multiple sensors 114 and/or capture devices 102a-102n for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.) and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the display 118 (e.g., the signal VOUT).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of the display 118 by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the display 118. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signal VOUT may be an encoded, cropped, stitched and/or enhanced version of one or more of the signals FRAMES_A-FRAMES_N. The signal VOUT may be a high resolution, digital, encoded, de-warped, stabilized, cropped, blended, stitched and/or rolling shutter effect corrected version of the signals FRAMES_A-FRAMES_N.

Figure 2:
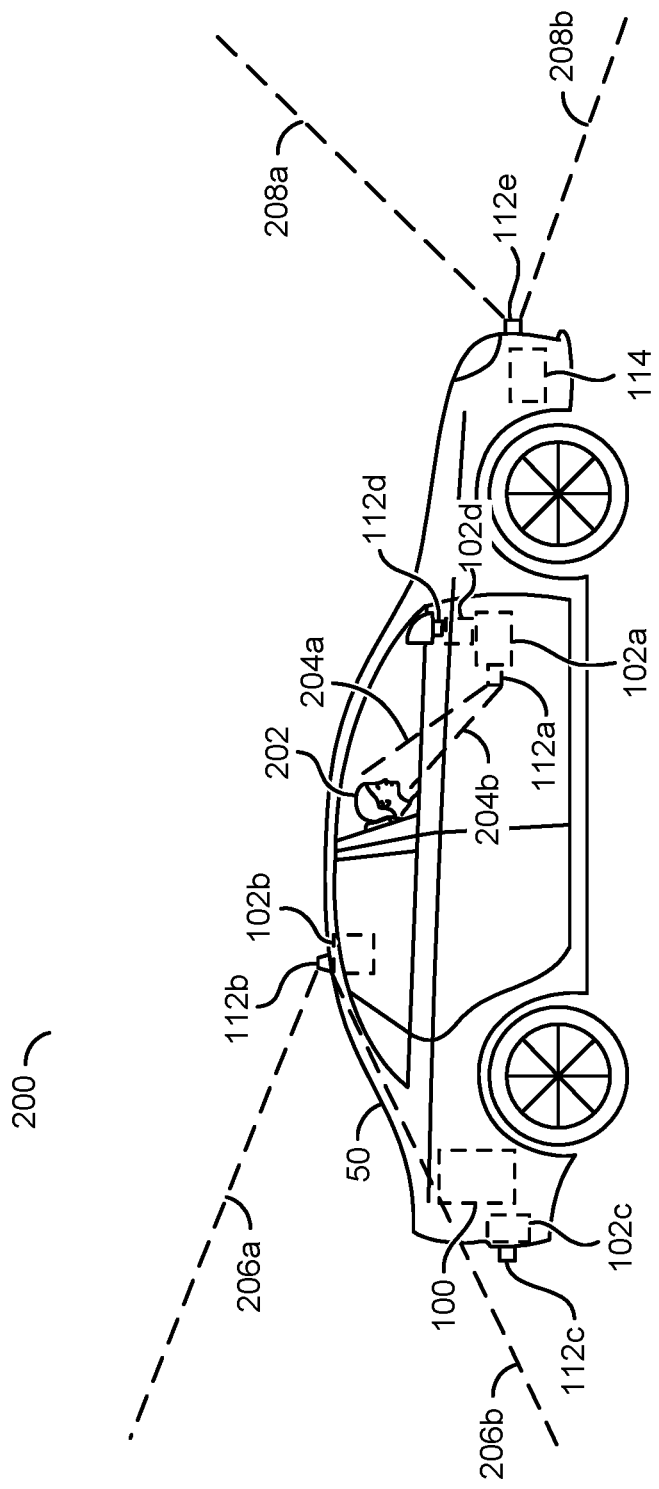
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be implemented to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc. The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
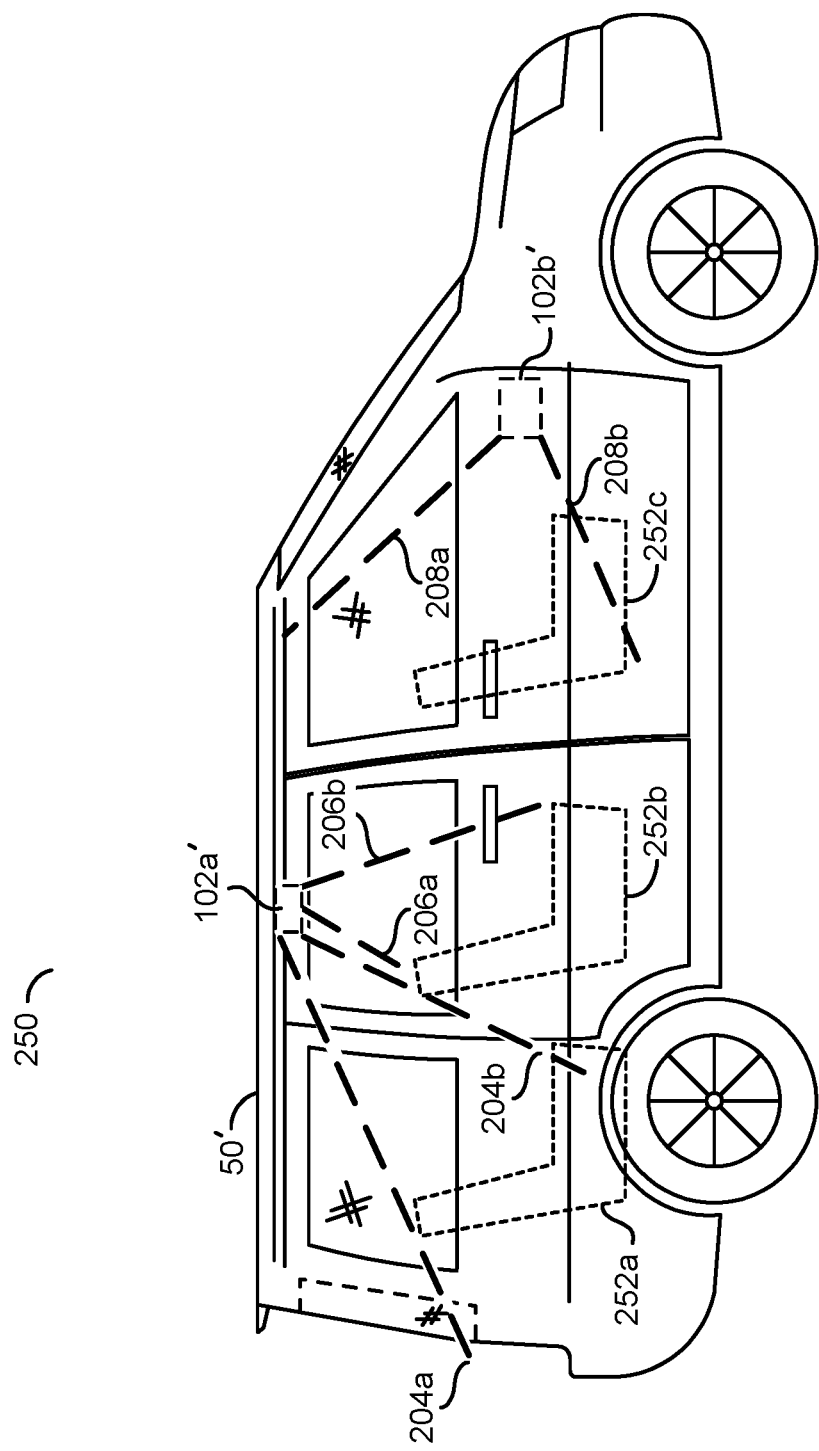
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the vehicle 50' are shown. Multiple rows of seats 252a-252c are shown in the vehicle 50'. Each of the rows of seats 252a-252c may be monitored to detect and/or classify one or more occupants of the vehicle 50'.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver, other occupants, physical characteristics of people in the vehicle, facial expressions of people in the vehicle, fields of view of the people in the vehicle, etc.). The processors 106a-106n may be configured to determine an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person. For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Figure 4:
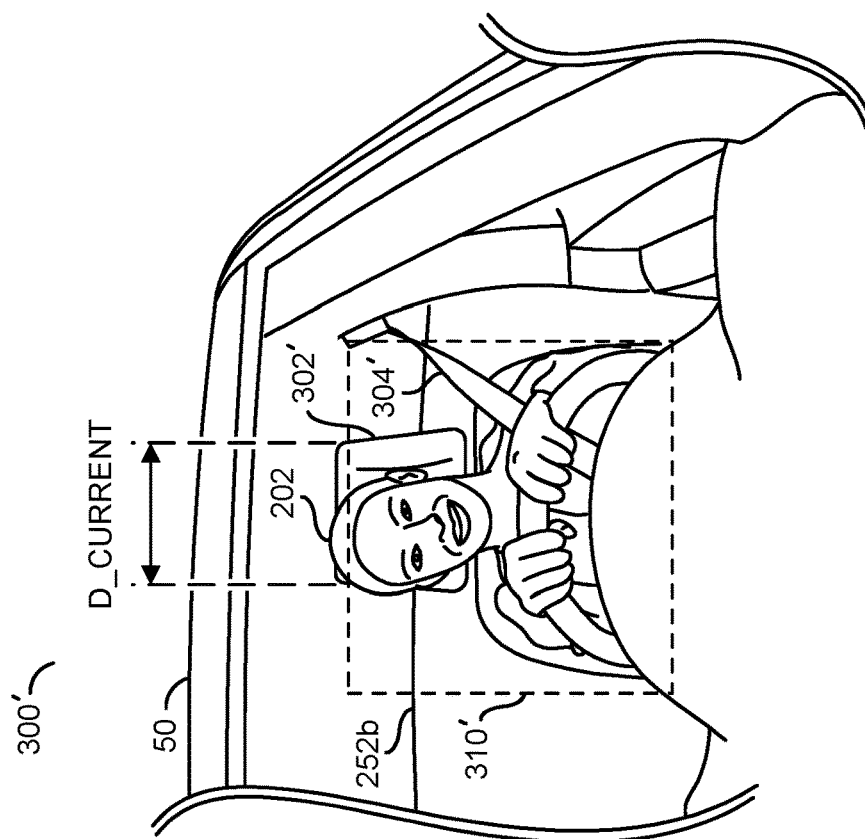
FIG. 4 is a diagram illustrating an object comparison between a reference video frame and a captured video frame.
Figure 4:
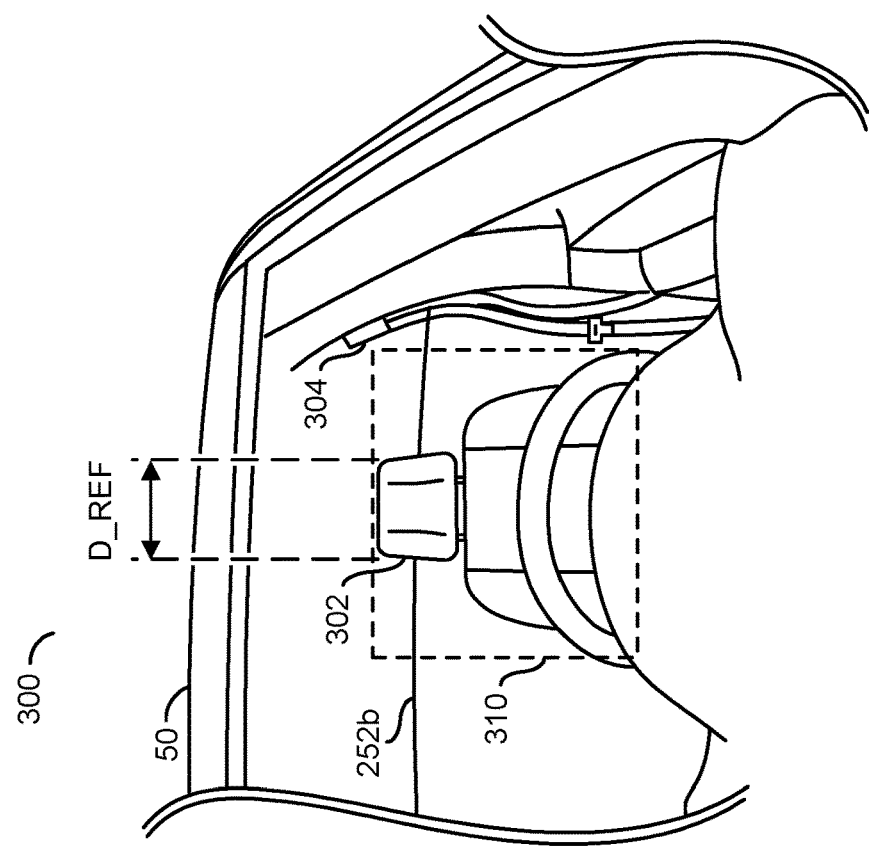

Referring to FIG. 4, a diagram illustrating an object comparison between a reference video frame 300 and a current video frame 300' is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
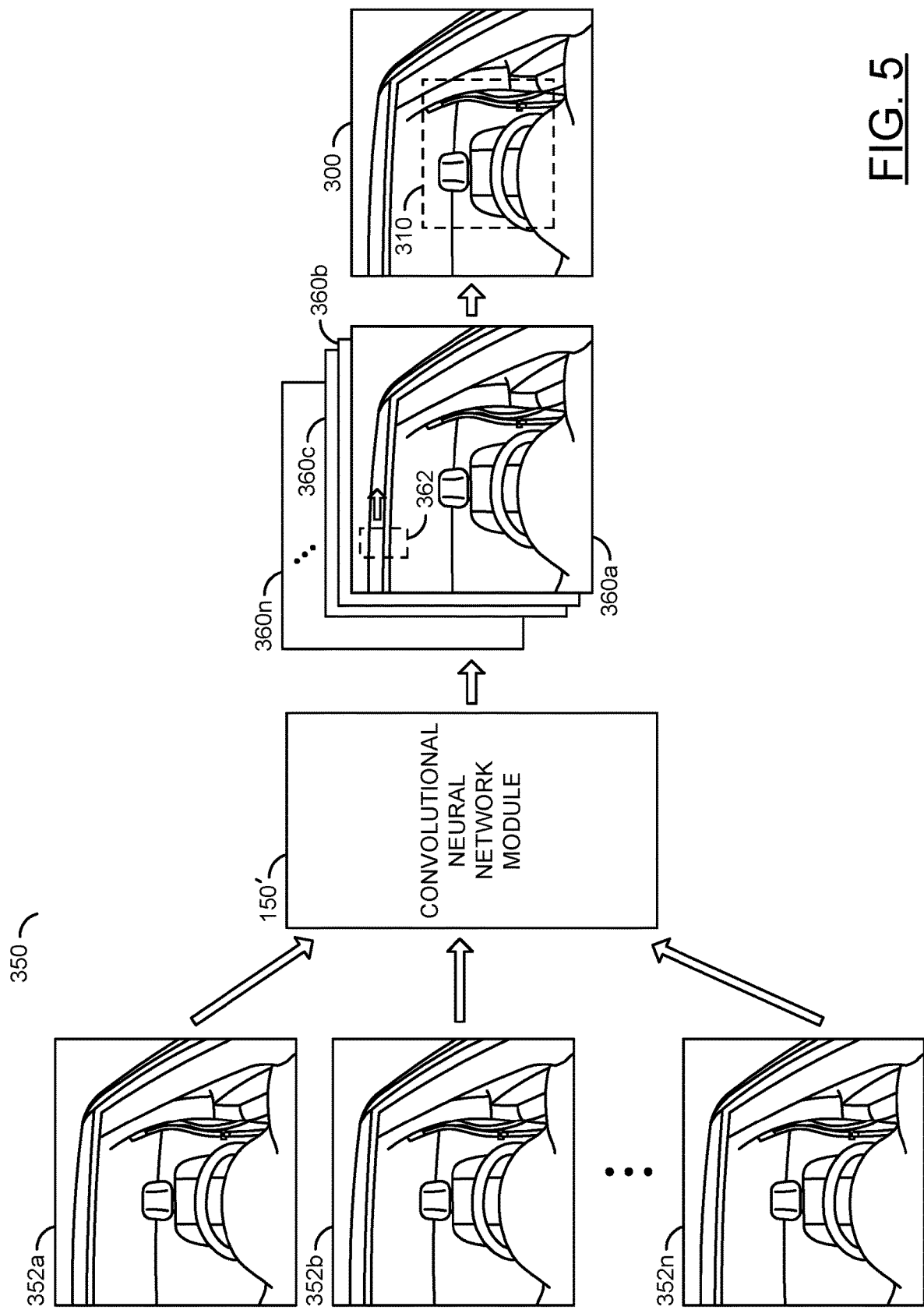
FIG. 5 is a diagram illustrating an example visualization of training a convolutional neural network for object detection using fleet learning.

Referring to FIG. 5, a diagram illustrating an example visualization 350 of training the convolutional neural network 150' for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, $YC_bC_r$, $YP_bP_r$, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'

Figure 6:
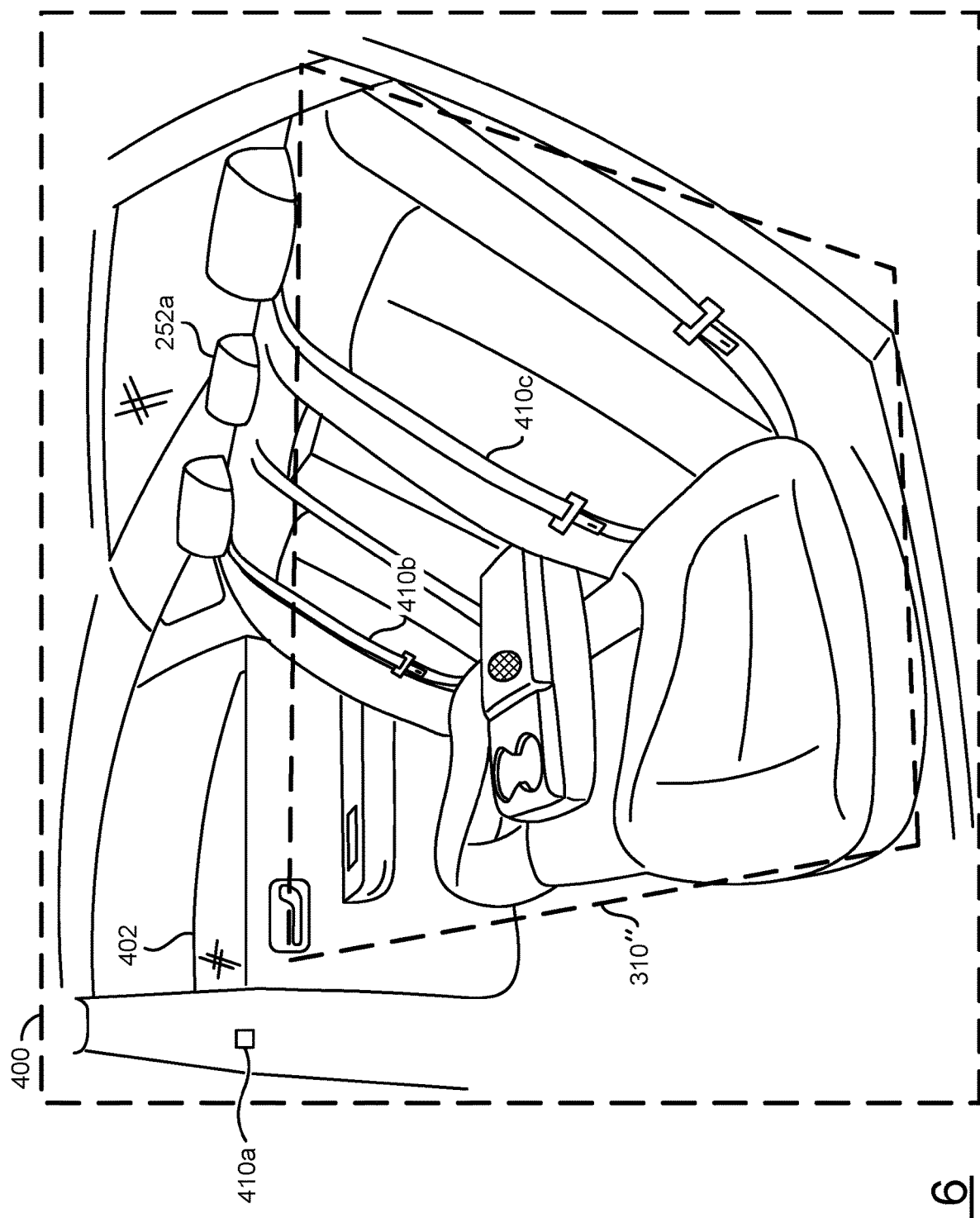
FIG. 6 is a diagram illustrating detecting reference objects corresponding to an empty vehicle seat in a video frame.

Referring to FIG. 6, a diagram illustrating detecting reference objects 310" corresponding to an empty vehicle seat in a video frame 400 is shown. The video frame 400 may be video data (e.g., one example video frame from a series of video frames in the video data) of the interior of the vehicle 50. The video frame 400 may be an example targeted wide angle view of the interior of the vehicle 50 captured by one of the capture devices 102a-102n. The video frame 400 is shown directed at the back row of seats 252a.

In some embodiments, the video frame 400 may be an example of reference frame. For example, the reference frame 400 may be used by the apparatus 100 to learn the locations of various reference objects in the vehicle 50. In another example, the video frame 400 may be used as video data for the training data 352a-352n. In yet another example, the video frame 400 may be an example of a current video frame undergoing the computer vision operations.

An open window 402 is shown in the video frame 400. In some embodiments, the locations of windows may be used to train the CNN module 150. In some embodiments, the processors 106a-106n may determine characteristics of various objects detected in the video frame 400. In the example shown, the processors 106a-106n may determine the characteristic of the window 402 is open.

Examples of mitigation responses 410a-410c are shown in the video frame 400. In some embodiments, the mitigation responses 410a-410c may be deployed and/or activated in response to a collision and/or an imminent collision. For example, the capture devices 102a-102n that provide an exterior view from the vehicle 50 may determine that an impact, collision and/or evasive maneuver is imminent by analyzing the video data and/or using the sensor fusion module 152 to analyze the sensors 114. To protect occupants of the vehicle 50, the mitigation responses 410a-410c may be deployed (e.g., before the impact and/or when the impact is detected). The apparatus 100 may generate the signal VCTRL' to activate one or more of the actuators 116. The actuators 116 may be used to operate on the mitigation response devices 410a-410c.

In the example shown, the mitigation response device 410a may be an air bag (e.g., a side air bag). In the example shown, the mitigation response device 410b and/or the mitigation device 410c may be seatbelts. For example, in response to the imminent collision, the actuators 116 may activate seatbelt pre-tensioning for the seatbelts 410b-410c. In another example, in response to the imminent collision, the actuators 116 may deploy the air bag 410a. The number and/or types of the mitigation response devices 410a-410c implemented may be varied according to the design criteria of a particular implementation. For example, the interface 104 may translate instructions from the processors 106a-106n to corresponding signals compatible with the actuators 116. In some embodiments, the interface 104 may provide an API for the actuators 116. For example, the interface 104 may translate a command to slow down from the processors 106a-106n based on the available actuators 116.

An example detected object 310" is shown. The example detected object 310" may be an unoccupied seat. In some embodiments, the unoccupied seat 310" may be a reference object used for comparison when a person is in the same seat in another video frame. In some embodiments, when the video frame 400 is a current video frame, the unoccupied seat 310" may represent a portion of the vehicle 50 that is the least vulnerable and/or not vulnerable. For example, if the unoccupied seat 310" does not have an occupant, then any mitigation reactions initiated by the apparatus 100 for the unoccupied seat 310" may be considered a low priority.

Figure 7:
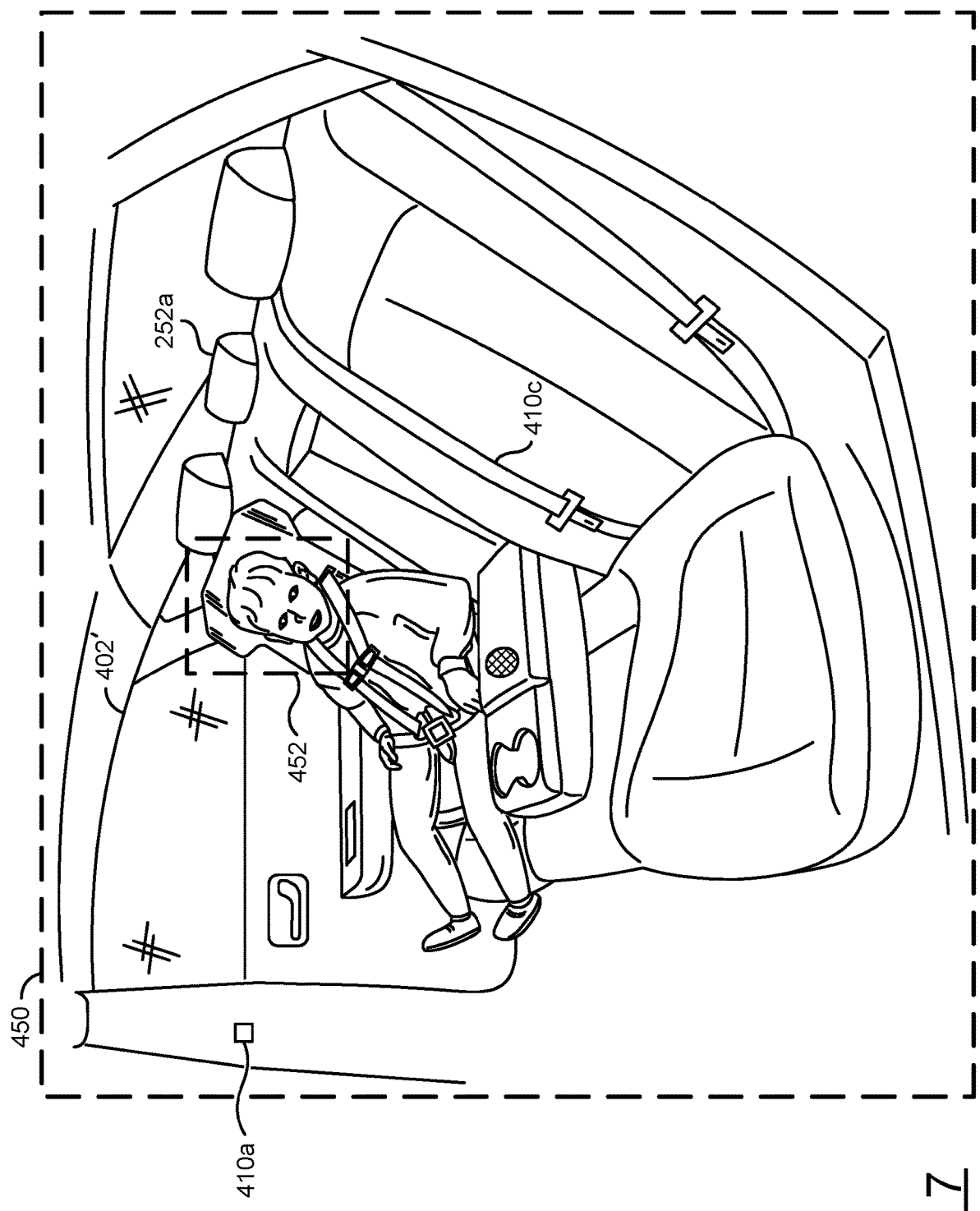
FIG. 7 is a diagram illustrating detecting a child in a video frame.

Referring to FIG. 7 a diagram illustrating detecting an occupant in a video frame 450 is shown. The video frame 450 may be video data (e.g., one example video frame from a series of video frames in the video data) of the interior of the vehicle 50. The video frame 450 may be generated similar to the video frame 400 (e.g., described in association with FIG. 6).

The video frame 450 is shown directed at the back row of seats 252a. An occupant 452 is shown in the video frame 450. In the example shown, the occupant 452 may be a small child. The small child 452 may be an example of a vulnerable occupant.

Generally, the driving policy module 154 may determine a vulnerability of the occupant 452. In some embodiments, different product vendors may program the driving policy module 154 with preferences on how to rank the vulnerability of the occupant 452. In some embodiments, the driving policy module 154 may be programmed according to local regulations. How the vulnerability of the occupant 452 is determined may be varied according to the design criteria of a particular implementation.

The processors 106a-106n may utilize the CNN module 150 to identify, detect and/or classify the occupant 452 (e.g., as a small child, in the example shown). The CNN module 150 may implement the computer vision operations to determine the characteristics of the occupant 452 (e.g., age, body position, whether the occupant is pregnant, etc.). The processors 106a-106n may utilize the classification of the occupant 452 and/or the characteristics of the occupant 452 determined using the computer vision operations in conjunction with the driving policy module 154 to determine the vulnerability of the occupant 452.

The level and/or rank of vulnerability determined by the processors 106a-106n may not imply a weakness, frailty and/or importance of the occupants 452. For example, in a traditional emergency situation, saving women and children is often prioritized. The vulnerability may comprise a likelihood of harm and/or a need for protection. For example, the occupant 452 that is closer to the impact point may be more vulnerable than another of the occupants 452. In another example, particular body parts (e.g., head, chest, arteries, etc.) may be more vulnerable than other body parts due to the risk of catastrophic injury. The level and/or rank of vulnerability of a particular occupant may change (e.g., more vulnerable if a vital body part is exposed, more vulnerable if not wearing a seat belt, less vulnerable if wearing a helmet, etc.). The level and/or rank of vulnerability may be used to prioritize which of the occupants 452 to protect when selecting the impact mitigation reaction.

In one example, a baby may be considered a highly vulnerable occupant. In another example, a healthy adult may be considered less vulnerable than a child. In yet another example, an elderly person may be considered more vulnerable than a healthy adult. In still another example, a person who is pregnant may be considered highly vulnerable. In another example, an empty seat may have the lowest vulnerability ranking since there may be nothing to protect. In yet another example, a pet may be considered less vulnerable than a child. In some embodiments, inanimate objects may have some degree of vulnerability compared to other objects (e.g., a highly valued object might be more important to protect than a worthless item). The level of vulnerability for the occupant 452 may be varied according to the design criteria of a particular implementation.

Generally, each occupant 452 of the vehicle 50 may be detected by the processors 106a-106n. The processors 106a-106n may determine various characteristics of the occupants 452 to determine how vulnerable each occupant may be. Each occupant 452 may be accorded a level of vulnerability according to the driving policy module 154. In an example, the level of vulnerability may enable the processor 106a-106n to rank a vulnerability of each of the occupants (e.g., from highest to lowest).

In some embodiments, based on the vulnerability ranking, the processors 106a-106n may determine how to prioritize any impact mitigation reactions. For example, the safety of a person carrying a child may be prioritized over a healthy adult since the healthy adult may be more likely to withstand injury.

In some embodiments, the processors 106a-106n may implement the computer vision operations to understand how a person may be vulnerable. In an example, a healthy adult may be vulnerable if the adult is riding in the passenger seat having a body position with feet resting on the dashboard (e.g., deploying an air bag as an impact mitigation reaction may cause more harm based on the body position). In another example, particular areas of the body of the occupants 452 may be more vulnerable (e.g., the midsection of a pregnant woman may be more vulnerable than the shoulders of the same person). How the vulnerability of occupants 452 are ranked and/or how different areas of the body of each occupant 452 are ranked may be varied according to the design criteria of a particular implementation.

The CNN module 150 may be configured to classify objects as the occupant 452. The CNN module 150 may further classify the occupant as a particular type and/or class of occupant (e.g., a child, a pet, an adult, an elderly person, a differently-abled person, etc.). The CNN module 150 may further determine characteristics of the occupant 452 based on the characteristics detected. The processor 106a-106n and/or the driving policy module 154 may determine a vulnerability of the occupant 452 based on the classification and/or the characteristics detected using the computer vision operations. The types of object classifications may be varied according to the design criteria of a particular implementation.

The video analytics and/or computer vision operations performed by the CNN module 150 may process the video frame 450 and/or other video signals for biometric markers to determine the characteristics of the occupant 452. For example, one or more of age, height and/or weight may be biometric markers used to determine the vulnerability of the occupant 452. The biometric markers may be used to differentiate between a child, an adolescent, etc. (e.g., a person that may not be capable of protecting themselves) and a young adult, teenager, adult, etc. (e.g., a person that may be less vulnerable).

In some embodiments, the age, height, weight and/or other biometric markers (e.g., characteristics) used to determine the vulnerability of the occupant 452 may be similar to attributes used in regulations for sitting in the front seat of a vehicle and/or other vehicle safety regulations. Various biometric markers may be stored as reference data in the look up table 170. For example, the look up table 170 may store different heights, weights, ages, etc. applicable to different regions (e.g., based on different regulations in a particular city/state/province/country). The types of biometric markers used to determine a vulnerability of the occupant 452 may be varied according to the design criteria of a particular implementation.

In some embodiments, the CNN module 150 may be configured to detect faces in the video frame 450. In some embodiments, the processor 106a-106n may be configured to recognize faces through facial recognition (e.g., based on faces stored as references in the memory 108). The vulnerability of the occupant 452 may be stored in the look up table 170 in association with the facial detection information corresponding to the occupant 452.

A high confidence level for a vulnerability and/or detection of a particular occupant may indicate that the computer vision result is consistent with the particular type of object (e.g., occupant). A low confidence for a vulnerability and/or detection of a particular occupant may indicate that the computer vision result is inconsistent with the particular type of object (e.g., occupant). Various checks may be performed to determine the confidence level. The vulnerability ranking may be performed when the confidence level is above a pre-defined threshold. In some embodiments, information from the vehicle sensors 114 (e.g., an amount of weight detected in a particular seat) may be used to adjust the confidence level.

The impact mitigation may comprise automatic responses by the vehicle 50 (e.g., using the actuators 116) implemented to improve a safety, reduce an amount of injury, increase a chance of survival and/or improve comfort of the occupant 452. For example, the processors 106a-106n may generate the signal VCTRL to the interface 104 and the interface 104 may forward the signal VCTRL' to the appropriate one of the actuators 116 to perform the impact mitigation reaction.

In some embodiments, the window 402' may be one of the mitigation response devices 410a-410c. In the example shown, the window 402' may be determined by the computer vision operations to be in a closed state. For example, opening the window 402' may be an appropriate impact mitigation response to enable the occupant 452 to escape a vehicle after a collision and/or enable rescue workers easier access to the occupant 452 of the vehicle 50. In another example, keeping the window 402' closed may be an appropriate impact mitigation reaction if the vehicle 50 has been submerged in water after a collision to prevent the occupant 452 from drowning.

The apparatus 100 may be configured to distinguish between objects interior to the vehicle 50 (e.g., the small child 452) and objects exterior to the vehicle 50 (e.g., a pedestrian outside the window 402'). For example, depth-sensing techniques may be implemented to determine which of the objects detected in the video frame 450 are inside the vehicle 50. In another example, the video frames from the interior of the vehicle 50 may be compared with video frames of the outside area of the vehicle 50 (e.g., one of the capture devices 102a-102n may capture a similar view outside of the vehicle 50 that may be seen through the window 402' from the video frame 450 captured by another one of the capture devices 102a-102n) to determine which objects are interior and which objects are exterior to the vehicle 50.

Figure 8:
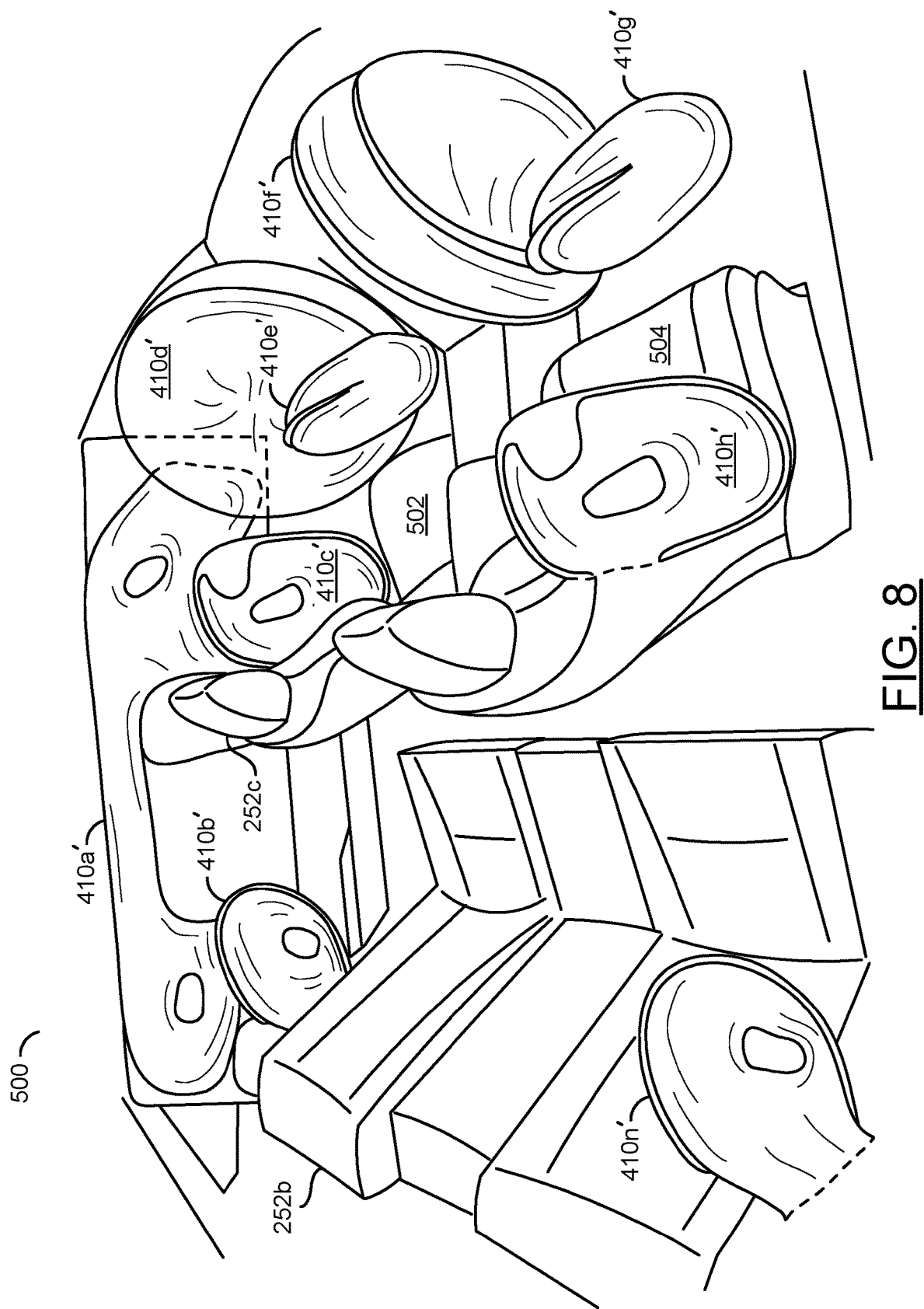
FIG. 8 is a diagram illustrating an example of impact mitigation reactions using air bag deployment.

Referring to FIG. 8, a diagram illustrating an example of impact mitigation reactions using air bag deployment is shown. An interior view 500 of the vehicle 50 is shown. For example, the interior view 500 may be one of the video frames (e.g., from the signals FRAMES_A-FRAMES_N) captured by one of the capture devices 102a-102n using a corresponding one of the wide angle lenses 112a-112n. In the example interior view 500, car seats from the rows 252b-252c are shown. A driver seat 502 and a passenger seat 504 are shown in the row 252c.

A number of air bags 410a'-410n' are shown. The air bags 410a'-410n' may be one example of the impact mitigation reactions that may be activated by the processors 106a-106n. The air bags 410a'-410n' may be deployed all at once, in groups and/or individually in order to protect the occupants of the vehicle 50. The air bags 410a'-410n' are shown distributed throughout the interior of the vehicle 50 (e.g., the air bag 410a' may be a side air bag, the air bag 410b' may be a rear passenger air bag, the air bag 410c' may be a driver side air bag, etc.). The number, type and/or arrangement of the air bags 410a'-410n' may be varied according to the design criteria of a particular implementation.

Based on the location and/or the classification of the occupant(s) 452 in the video frames, the processors 106a-106n may determine the appropriate reaction(s). In some embodiments, the processors 106a-106n may only generate the signal VCTRL (e.g., to activate one or more of the air bags 410a'-410n') if a potential collision is unavoidable. The impact mitigation reaction may be selected and/or performed based on the vulnerability of the occupant 452 determined by the computer vision operations. The impact mitigation reaction may be an automatic response initiated by the processors 106a-106n and performed by the actuators 116 of the vehicle 50.

The signal VCTRL may be implemented by the processors 106a-106n to provide an activation for the impact mitigation reactions in response to the detection, recognition and/or classification of the occupants 452. For example, the signal VCTRL may be sent to the interface 104 and the interface 104 may interpret the signal VCTRL and forward the instructions and/or electrical signal(s) as the signal VCTRL' to the actuators 116 in order to activate the appropriate device to initiate the impact mitigation reactions (e.g., activating the air bags 410a'-410n', restraining seatbelts, activating the brakes, etc.).

In some embodiments, the air bags 410a'-410n' may be deployed based on the determined vulnerability of the occupants 452. In one example, if the driver 202 in the seat 502 is the only occupant 452, then the air bags 410a', 410c', 410d' and/or 410e' may be the only air bags deployed (e.g., to save the cost of unnecessarily deploying air bags for empty seats). In another example, if a passenger is in the seat 504 and the computer vision operations determine that the passenger is in a body position with feet on the dashboard, then the air bag 410f' and/or the air bag 410g' may not be deployed (e.g., if the decision module 158 determines that the likelihood of a spinal injury caused by the air bags 410f' and/or 410g' is greater than an injury caused by not deploying the air bags 410f' and/or 410g'). In yet another example, if the passenger in the seat 504 is pregnant, the air bags 410f' and/or 410h' may be deployed, but the air bag 410g' may not be deployed (e.g., to protect the head of the pregnant passenger, but avoid an impact to the mid-section caused by the air bag 410g' that might harm the unborn child). How the air bags 410a'-410n' are deployed in response to the determined vulnerabilities of the occupants 452 may be varied according to the design criteria of a particular implementation.

Figure 9:
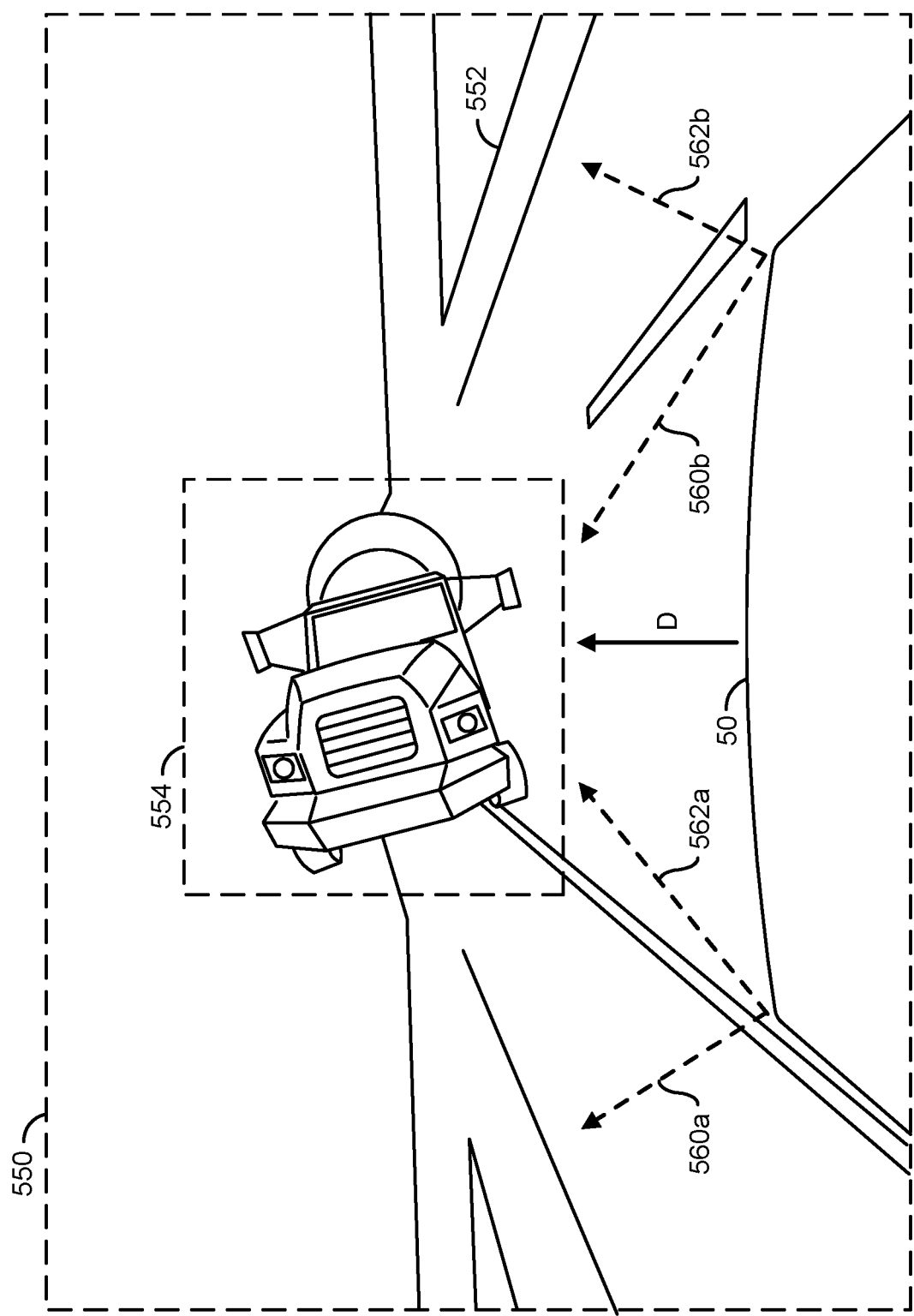
FIG. 9 is a diagram illustrating an example scenario of an unavoidable collision.

Referring to FIG. 9, a diagram illustrating an example scenario of an unavoidable collision is shown. A video frame 550 is shown capturing the example scenario. The video frame 550 may be generated by one of the capture devices 102a-102n configured to capture an area outside of the vehicle 50. In the example shown, the video frame 550 may capture the area to the front of the vehicle 50. The video frame 550 may be one of a sequence of video frames. The hood of the vehicle 50 is shown at a bottom portion of the video frame 550. The apparatus 100 may comprise connections to numerous cameras 102a-102n directed to capture the area outside of the vehicle 50 (e.g., forward cameras, reverse/rear cameras, sideward cameras, blind spot cameras, cameras directed towards the ground, 360 degree cameras, etc.). The number and/or types of cameras used to capture the area outside of the vehicle 50 may be varied according to the design criteria of a particular implementation.

In the example shown, the area exterior to the vehicle 50 captured by the video frame 550 may comprise a road 552. The processors 106a-106n may perform computer vision on the area outside of the vehicle 50 to "see" what the driver 202 would see (and more) to make driving decisions (e.g., in autonomous vehicle embodiments), to provide warnings (e.g., in a driver-controlled vehicle embodiment) and/or perform vehicle operations (e.g., such as applying the brakes in a semi-autonomous vehicle embodiment). The processors 106a-106n may analyze, classify and/or recognize objects in the video frame 550 along with analyzing information from the sensors 114 to infer the situation and/or driving scenario (e.g., where the vehicle 50 is on the road, what objects are around the vehicle 50, how far away are the objects from the vehicle 50, what direction is the vehicle 50 traveling, what is the path of the road 552, what are the likely trajectories of the objects near the vehicle 50, etc.). In one example, the processors 106a-106n may be configured to determine whether the vehicle 50 may end up colliding with another object (e.g., a potential collision with another vehicle, a potential collision with a static object such as a sign and/or a lamp post, a potential impact with a pot hole or speed bump, etc.).

A truck 554 is shown. The truck 554 may be a cement truck that is part of oncoming traffic. The truck 554 may be one of the objects detected by the CNN module 150. The CNN module 150 may be configured to determine a shape, orientation and/or arrangement of the object 554. Over a sequence of video frames, including the video frame 550, the CNN module 150 may track the object 554 with respect to the vehicle 50. Generally, for oncoming traffic such as the truck 554, the size of the object may increase as the truck 554 passes safely on the road 552 in the lane opposite to the vehicle 50.

Based on the computer vision operations performed by the CNN module 150, the decision module 158 may determine the relationship of the vehicle 50 to the truck 554. In one example, the decision module 158 may determine that even though the oncoming truck is fast approaching the vehicle 50, the oncoming truck 554 may pass by the vehicle 50 safely in the next lane. In another example, the decision module 158 may determine that the truck 554 is approaching the vehicle 50 and a potential impact may occur. In yet another example, the decision module 158 may determine that the truck 554 is unavoidable and the potential collision is imminent. When the collision with the object 554 is unavoidable, the processors 106a-106n may perform one or more of the impact mitigation responses.

A distance D is shown. The processors 106a-106n may determine the distance D from the vehicle 50 to the object 554. The distance D may be used to determine whether the potential collision with the object 554 is unavoidable. The distance D may be used by the decision module 158 to determine whether options for the impact mitigation responses are viable. In an example, applying the brakes may not be a viable option for the impact mitigation response if the distance D is small enough that the vehicle 50 would be unable to stop in time to avoid the collision (or reduce an amount of damage caused by the impact).

In the example shown, the CNN module 150 may determine that the truck 554 (e.g., based on the orientation and speed) is approaching the vehicle 50 and has tipped over (e.g., an unexpected and/or uncontrollable event). Based on the trajectory of the object 554, a potential collision may occur. Since the truck 554 is out of control and approaching the vehicle 50, the potential collision may be imminent. Since the potential collision may be imminent, the truck 554 may be an unavoidable object. The processors 106a-106n may detect the unavoidable object 554, determine one or more options for mitigating the impact of the collision with the unavoidable object 554 and select one or more of the impact mitigation reactions from the options based on the vulnerability of the occupants 452.

A pair of lines 560a-560b are shown. A pair of lines 562a-562b are shown. The lines 560a-560b and/or the lines 562a-562b may represent impact mitigation reaction options for the vehicle 50 in response to the unavoidable object 554. The lines 560a-560b may represent a path of the vehicle 50 in response to swerving to the left. The lines 562a-562b may represent a path of the vehicle 50 in response to swerving to the right. In the example shown, swerving to the left or swerving to the right may result in a path that collides with the unavoidable object 554 but still protects some of the occupants 452. Swerving to the left may be one of the impact mitigation reaction options initiated by the processors 106a-106n. Swerving to the right may be one of the impact mitigation reaction options initiated by the processors 106a-106n.

Swerving to the left or the right may be a representative example of impact mitigation reactions implemented by the processors 106a-106n. Swerving to the left or the right may be an example of mutually exclusive impact mitigation reactions. In some embodiments, the processors 106a-106n may initiate more than one impact mitigation reaction (e.g., activating the air bags 410a'-410n' in addition to swerving to the left or right). Swerving to the left or the right may be an example of an autonomous driving impact mitigation reaction method (e.g., a reaction that effects the direction and/or speed of the vehicle 50). The number and/or type of the mitigation reactions available to the processors 106a-106n may be varied according to the design criteria of a particular implementation.

Figure 10:
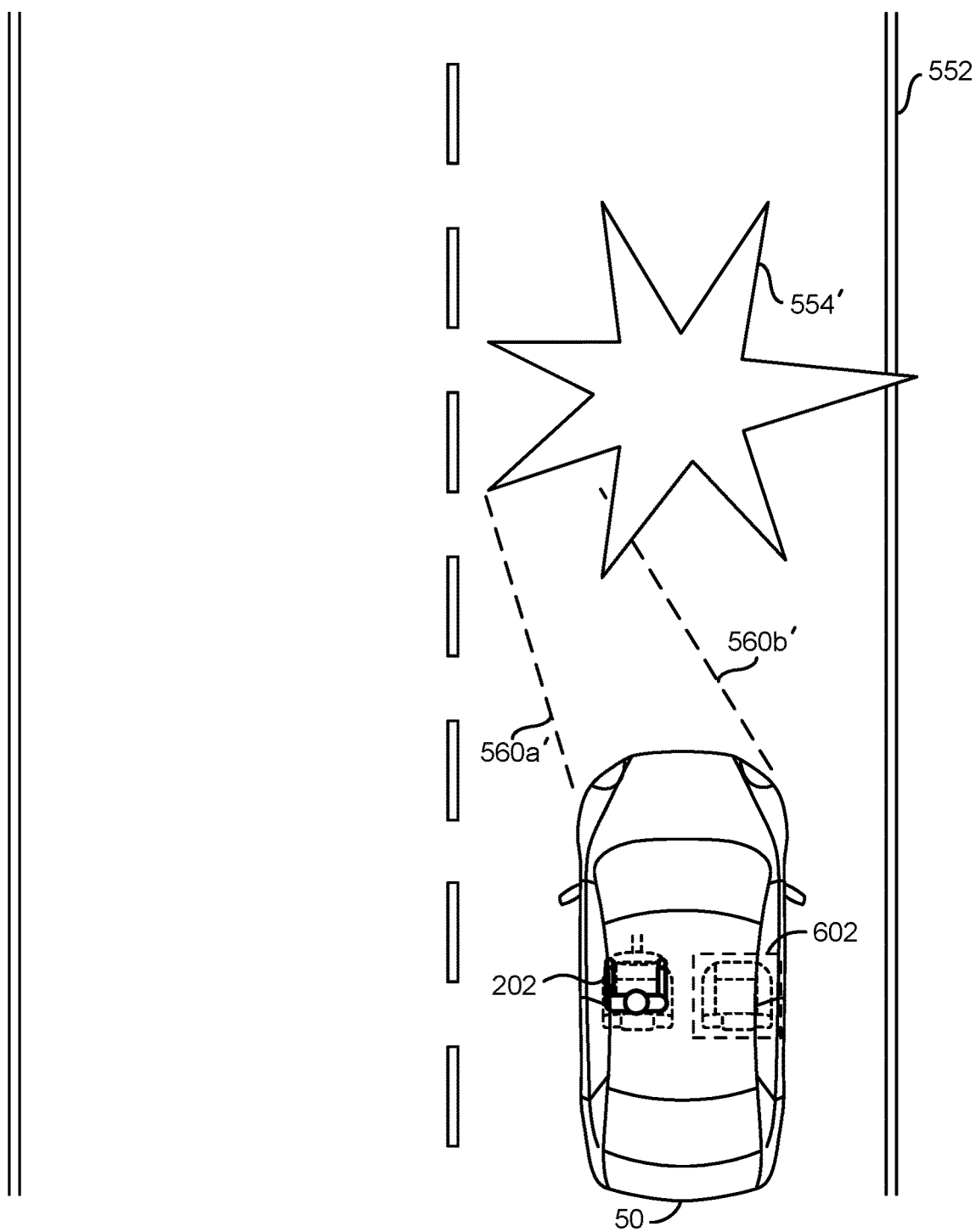
FIG. 10 is a diagram illustrating an example mitigation reaction to an unavoidable collision based on occupant vulnerability.

Referring to FIG. 10, a diagram illustrating an example mitigation reaction to an unavoidable collision scenario 600 based on occupant vulnerability is shown. The unavoidable collision scenario 600 may provide an alternate overhead view of the scenario shown in the video frame 550 described in association with FIG. 9. The vehicle 50 is shown on the road 552. The potential collision symbol 554' may represent the truck in the path of the vehicle 50. The potential collision 554' may be an unavoidable object. For example, the collision between the vehicle 50 and the unavoidable object 554' may be imminent. In the example shown, the vehicle 50 may be in a position that would result in a head on collision with the unavoidable object 554'.

The driver 202 is shown within the vehicle 50. For example, the processors 106a-106n may detect the driver 202 as one of the occupants 452. A detected empty seat 602 is shown. The detected empty seat 602 may be the passenger seat 504. In the example shown, the driver 202 may be the only occupant 452 in the vehicle 50.

Since the driver 202 is the only occupant 452 of the vehicle 50, in the example shown, the driver 202 may have the highest vulnerability rank. For example, the detected empty seat 602 may have a lowest vulnerability rank and/or have a null priority. The processors 106a-106n may determine that the driver 202 is the highest priority for protection in the imminent collision with the unavoidable object 554'. The processors 106a-106n may initiate the impact mitigation reaction to protect the driver 202 and/or reduce an amount of potential damage or injury to the driver 202. For example, the amount of potential injury to the driver 202 may be reduced by attempting to focus the imminent impact with the unavoidable object 554' on a particular area(s) of the vehicle 50 (e.g., areas of the vehicle 50 that are far away from the driver 202, areas of the vehicle 50 that are designed to absorb impacts such as crumple zones, areas of the vehicle 50 that when damaged do not compromise the area near the driver 202, etc.).

The path represented by the lines 560a'-560b' is shown. The path 560a'-560b' may represent the impact mitigation reaction of swerving to the left. Since the collision with the unavoidable object 554' is unavoidable, the path 560a'-560b' may still lead to a collision. However, the path 560a'-560b' may be selected to protect the driver 202 (e.g., determined to be the vulnerable occupant 452 in the example shown). By following the path 560a'-560b' the vehicle 50 may swerve to the left and expose the passenger side of the vehicle 50 to the impact. By exposing the passenger side of the vehicle 50 to the impact, a portion of the vehicle 50 with the detected empty seat 602 may absorb the brunt of the collision, while the driver 202 is kept farther away from the impact. Keeping the driver 202 farther away from the impact with the unavoidable object 554' may protect the driver 202. In another example, following the path 562a-562b (e.g., swerving to the right as shown as one impact mitigation reaction option in association with FIG. 9) would expose the driver 202 to the impact while protecting the detected empty seat 602 (e.g., increase a likelihood of injury to the driver 202).

In the example shown, since the driver 202 has been determined to be the vulnerable occupant 452, selecting the path 560a'-560b' may be the impact mitigation reaction selected by the processors 106a-106n. While the path 560a'-560b' may be the option that protects the driver 202, other considerations may be made by the driving policy module 154 when selecting the impact mitigation reaction. In one example, swerving to the left may cause the vehicle 50 to move into the opposite lane (e.g., endangering other vehicles in oncoming traffic based on V2X information from the communication devices 110). In another example, swerving to the left may cause the vehicle 50 to drive off the road into a ditch or body of water. The considerations for selecting the impact mitigation reaction by the processors 106a-106n may be varied according to the design criteria of a particular implementation.

In the example shown, swerving to the left may be the best option to protect the driver 202. In another example scenario, a passenger may be in the detected seat 602. If a passenger is in the detected seat 602, the processors 106a-106n may determine which of the occupants 452 is more vulnerable (e.g., swerve left if the driver 202 is more vulnerable and swerve right if the occupant in the seat 602 is more vulnerable). In yet another example, both the driver 202 and another occupant of the vehicle 50 may be determined to be similarly vulnerable. When occupants are similarly vulnerable, the processors 106a-106n may perform another impact mitigation reaction (e.g., not swerve in order to hit the object 554' head on and share the impact equally between the occupants, pick an impact mitigation that protects one occupant over another randomly, put more decision weight on other factors such as effects of the impact mitigation reaction on other vehicles, etc.). The method for conflict resolution for selecting between vulnerable occupants may be varied according to the design criteria of a particular implementation.

Figure 11:
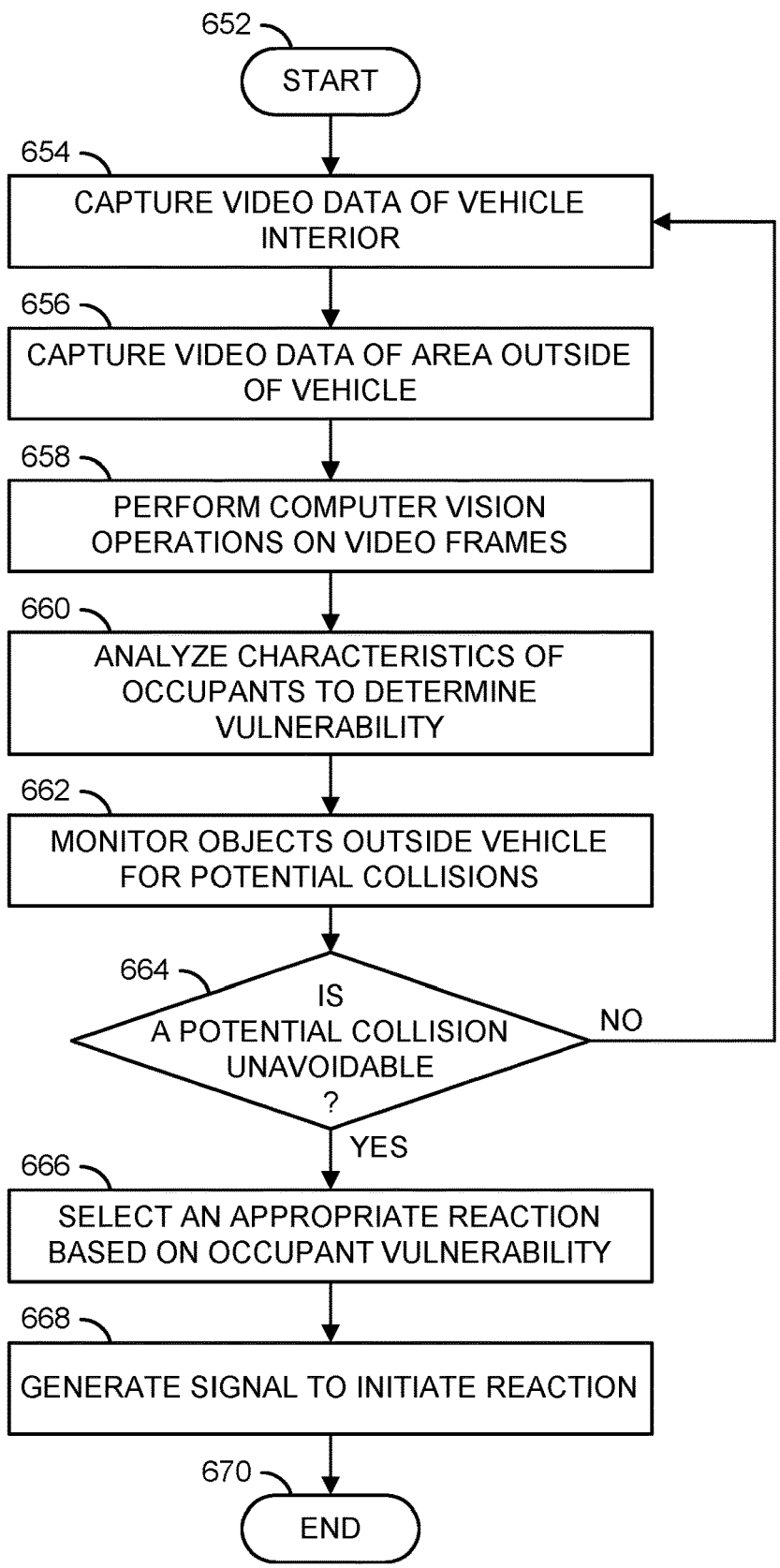
FIG. 11 is a flow diagram illustrating a method for performing computer vision to detect a collision and reacting to vulnerable occupants.

Referring to FIG. 11, a method (or process) 650 is shown. The method 650 may perform computer vision to detect a collision and react to vulnerable occupants. The method 650 generally comprises a step (or state) 652, a step (or state) 654, a step (or state) 656, a step (or state) 658, a step (or state) 660, a step (or state) 662, a decision step (or state) 664, a step (or state) 666, a step (or state) 668, and a step (or state) 670.

The step 652 may start the method 650. In the step 654, one or more of the capture devices 102a-102n may capture video data of the interior of the vehicle 50. Next, in the step 656, one or more of the capture devices 102a-102n may capture video data of an area outside of the vehicle 50. In the step 658, the processors 106a-106n may perform computer vision operations on the captured video frames FRAMES_A-FRAMES_N. Next, in the step 660, the processors 106a-106n may analyze the characteristics of the occupants to determine a vulnerability of each occupant. In the step 662, the processors 106a-106n may monitor for objects outside of the vehicle 50 for potential collisions with the vehicle 50. Next, the method 650 may move to the decision step 664.

In the decision step 664, the processors 106a-106n may determine whether a potential collision is unavoidable. If the potential collision is avoidable, the method 650 may return to the step 654. If the potential collision is unavoidable, the method 650 may move to the step 666. In the step 666, the decision making module 158 may select an appropriate reaction based on the vulnerability of one or more of the occupants. Next, in the step 668, the processors 106a-106n may generate the signal VCTRL to initiate the selected reaction. For example, the selected reaction may be performed by the actuators 116. Next, the method 650 may move to the step 670. The step 670 may end the method 650.

Figure 12:
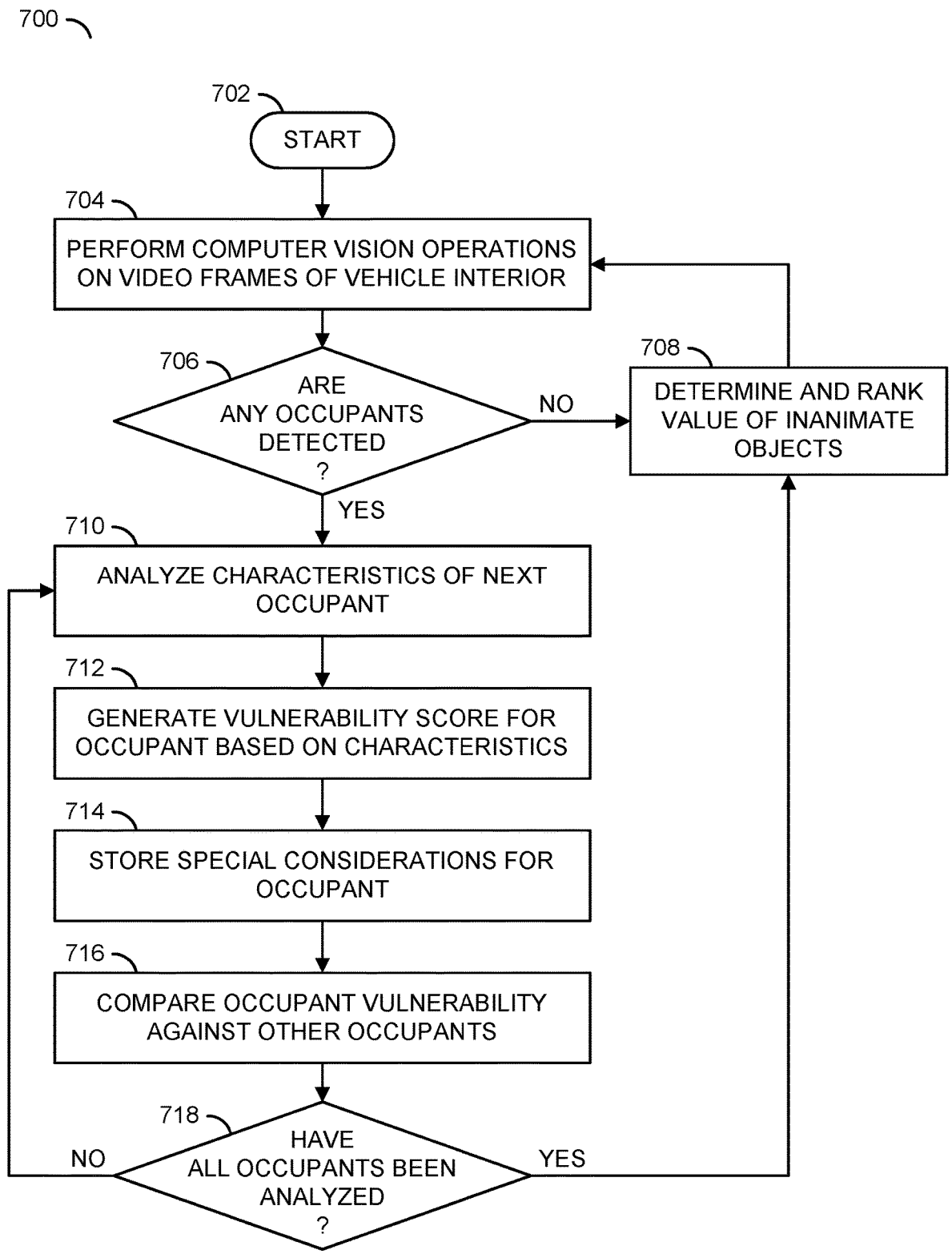
FIG. 12 is a flow diagram illustrating a method for ranking a vulnerability of occupants within a vehicle.

Referring to FIG. 12, a method (or process) 700 is shown. The method 700 may rank a vulnerability of occupants within a vehicle. The method 700 generally comprises a step (or state) 702, a step (or state) 704, a decision step (or state) 706, a step (or state) 708, a step (or state) 710, a step (or state) 712, a step (or state) 714, a step (or state) 716, and a decision step (or state) 718.

The step 702 may start the method 700. In the step 704, the processors 106a-106n may perform computer vision operations on the video frames FRAMES_A-FRAMES_N of the interior of the vehicle 50. Next, the method 700 may move to the decision step 706.

In the decision step 706, the processors 106a-106n determine whether any occupants are detected in the interior of the vehicle 50. If not, the method 700 may move to the step 708. In the step 708, the processors 106a-106n may determine and/or rank a value of the inanimate objects (e.g., monetary value, a size, a shape, whether the inanimate object is secured in place, etc.). Next, the method 700 may return to the step 704. In the decision step 706, if one or more occupants are detected in the interior of the vehicle 50, the method 700 may move to the step 710.

In the step 710, the processors 106a-106n may analyze the characteristics of the next occupant. In some embodiments, the characteristics of the occupants may be analyzed sequentially. In some embodiments, the characteristics of each of the occupants may be analyzed in parallel. Next, in the step 712, the processors 106a-106n may generate a vulnerability score for the occupant based on the characteristics. For example, the vulnerability score may be a numeric value, a matrix of values, a description, etc. The type of vulnerability score may be varied according to the design criteria of a particular implementation. Next, the method 700 may move to the step 714.

In the step 714, the processors 106a-106n may store special considerations of the occupant. The special considerations may be determined by the driving policy module 154. For example, a special consideration may be that the occupant is pregnant. In another example, the special consideration may be that the occupant is a child. In yet another example, the special consideration may be that the occupant is in a vulnerable position (e.g., feet on the dashboard). Next, in the step 716, the processors 106a-106n may compare the occupant vulnerability against the other occupants (e.g., to rank the vulnerability of the occupants). Next, the method 700 may move to the decision step 718.

In the decision step 718, the processors 106a-106n may determine whether all of the occupants have been analyzed. If not, the method 700 may return to the step 710. If all the occupants have been analyzed, the method 700 may move to the step 708.

Figure 13:
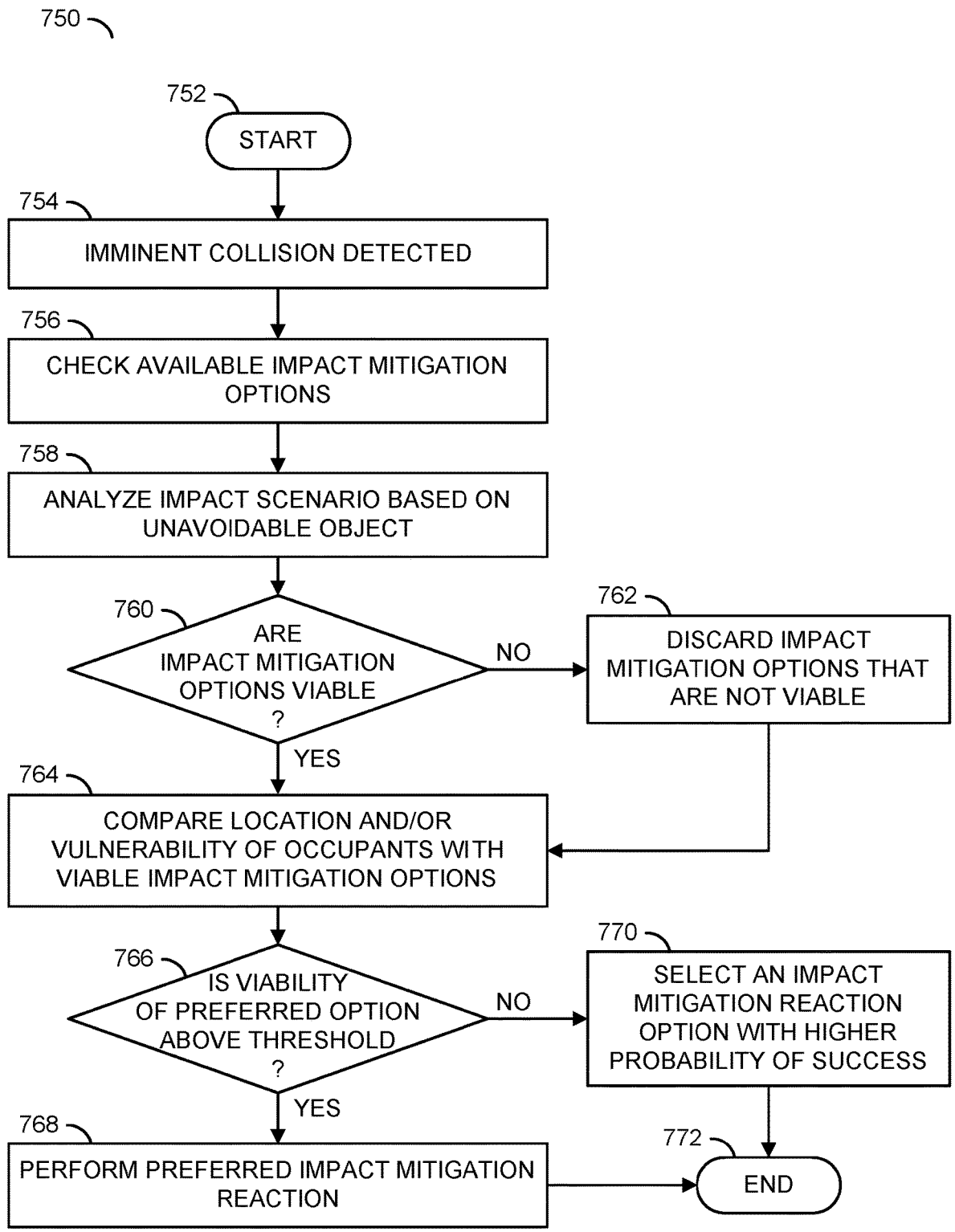
FIG. 13 is a flow diagram illustrating a method for determining a viability of impact mitigation options.

Referring to FIG. 13, a method (or process) 750 is shown. The method 750 may determine a viability of impact mitigation options. The method 750 generally comprises a step (or state) 752, a step (or state) 754, a step (or state) 756, a step (or state) 758, a decision step (or state) 760, a step (or state) 762, a step (or state) 764, a decision step (or state) 766, a step (or state) 768, a step (or state) 770, and a step (or state) 772.

The step 752 may start the method 750. In the step 754, the processors 106a-106n may detect an imminent collision. Next, in the step 756, the processors 106a-106n may check available impact mitigation options. For example, the processors 106a-106n may receive a status update from the actuators 116 via the interface 104. In the step 758, the processors 106a-106n may analyze the impact scenario based on the unavoidable object 554 (e.g., speed, trajectory, location of collision with the vehicle 50, size, etc.). Next, the method 750 may move to the decision step 760.

In the decision step 760, the processors 106a-106n may determine which of the impact mitigation options are viable. If the impact mitigation options are viable, the method 750 may move to the step 764. If one of the impact mitigation options are not viable, the method 750 may move to the step 762. In the step 762, the decision making module 158 may discard the impact mitigation options that are not viable. Next, the method 750 may move to the step 764. In the step 764, the processors 106a-106n may compare a location and/or vulnerability of the occupants with the viable impact mitigation options. Next, the method 750 may move to the decision step 766.

In the decision step 766, the decision making module 158 may determine whether a viability of a preferred option is above a threshold. For example, the threshold may be a probability of success below which the impact mitigation option may be unlikely to be successful. In an example, the preferred impact mitigation option may be the option determined by the decision making module 158 to be the most desirable result based on the vulnerability of the occupants. How the decision making module 158 determines the most desirable result may be determined based on a design criteria of a particular implementation.

In the decision step 766, if the preferred option is above the threshold, the method 750 may move to the step 768. In the step 768, the processors 106a-106n may perform the preferred impact mitigation reaction (e.g., generate the signal VCTRL for the interface 104 to activate the associated actuators 116). Next, the method 750 may move to the step 772. In the decision step 766, if the preferred option is not above the threshold, the method 750 may move to the step 770. In the step 770, the decision making module 158 may select an impact mitigation option with a higher probability of success. Next, the method 750 may move to the step 772. The step 772 may end the method 750.

Figure 14:
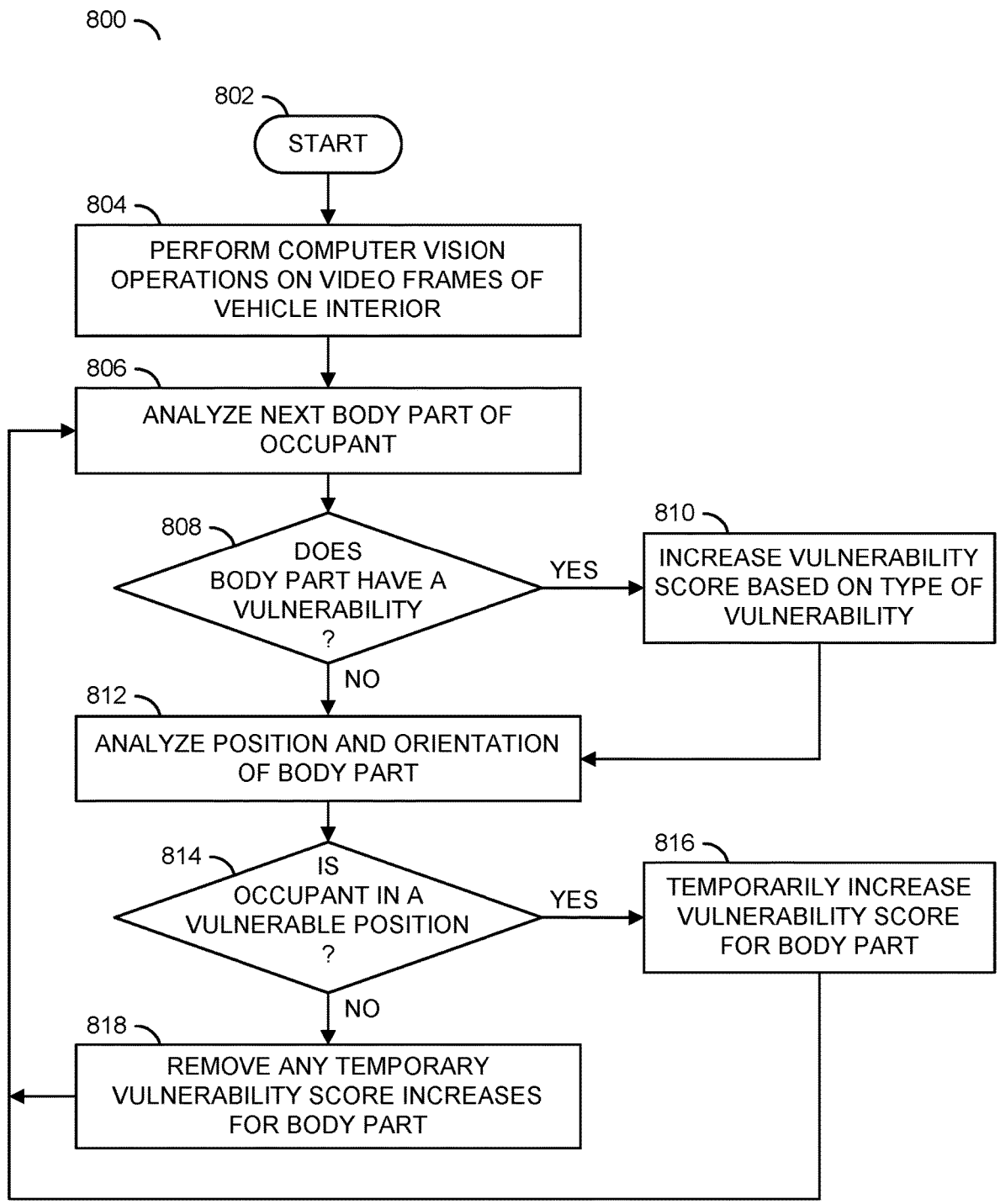
FIG. 14 is a flow diagram illustrating a method for determining a vulnerability of body parts of an occupant.

Referring to FIG. 14, a method (or process) 800 is shown. The method 800 may determine a vulnerability of body parts of an occupant. The method 800 generally comprises a step (or state) 802, a step (or state) 804, a step (or state) 806, a decision step (or state) 808, a step (or state) 810, a step (or state) 812, a decision step (or state) 814, a step (or state) 816, and a step (or state) 818.

The step 802 may start the method 800. Next, in the step 804, the processors 106a-106n may perform the computer vision operations on the video frames FRAMES_A-FRAMES_N of the interior of the vehicle 50. In the step 806, the processors 106a-106n may analyze the next body part of the occupant. In some embodiments, the processors 106a-106n may analyze the body parts of the occupants in a particular sequence. In some embodiments, the processors 106a-106n may analyze the body parts of the occupants in parallel. Next, the method 800 may move to the decision step 808.

In the decision step 808, the processors 106a-106n may determine whether a body part has a vulnerability (e.g., wearing a cast, not secured properly, resting against the window, carrying child, etc.). If the body part does not have a vulnerability, the method 800 may move to the step 812. If the body part does have a vulnerability, the method 800 may move to the step 810. In the step 810, the decision making module 158 may increase a vulnerability score based on the type of vulnerability. Next, the method 800 may move to the step 812. In the step 812, the processors 106a-106n may analyze the position and/or orientation of the body part. Next, the method 800 may move to the decision step 814.

In the decision step 814, the processors 106a-106n may determine whether the occupant is in a vulnerable position. For example, the occupant may be in a vulnerable position if the person is turned around looking backwards, if they are leaning forwards, if they are too close/far from a component of a vehicle, if they are too close/far from where an air bag could deploy, etc. If the occupant is in a vulnerable position, the method 800 may move to the step 816. In the step 816, the decision making module 158 may temporarily increase the vulnerability score for the body part. Next, the method 800 may return to the step 806. In the decision step 814, if the occupant is not in a vulnerable position, the method 800 may move to the step 818. In the step 818, the decision making module 158 may remove any temporary vulnerability score increases for the body part. Next, the method 800 may return to the step 806.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a first capture device configured to generate a first plurality of video frames corresponding to an interior view of a vehicle;
    a second capture device configured to generate a second plurality of video frames corresponding to an area outside of said vehicle; and
    a processor configured to (i) perform operations to detect objects in (a) said first video frames and (b) said second video frames, (ii) detect occupants of said vehicle based on said objects detected in said first video frames, (iii) determine a likelihood of a potential collision based on said objects detected in said second video frames, (iv), continue without a reaction when said potential collision is determined to be avoidable, and (v) select a reaction when said potential collision is determined to be unavoidable, wherein
    said potential collision is determined by tracking a trajectory of said objects with respect to said vehicle by using a feature detection window based on neural network weight values for each of said objects extracted from a plurality of layers over a series of said plurality of said second video frames, said neural network weight values are determined in response to an analysis of training data by said processor prior to feature extraction,
    said reaction is selected to protect occupants determined to be vulnerable based on characteristics of said occupants, and
    said characteristics are determined by performing said operations on each of said occupants.

2. The apparatus according to claim 1, wherein said operations comprise computer vision.

3. The apparatus according to claim 2, wherein said reaction implements a situational impact mitigation reaction determined using computer vision in response to said potential collision.

4. The apparatus according to claim 2, wherein said computer vision is implemented by a convolutional neural network.

5. The apparatus according to claim 4, wherein said convolutional neural network is trained using fleet learning.

6. The apparatus according to claim 5, wherein (i) said fleet learning comprises capturing reference images using a capture device in a vehicle production facility, (ii) said reference images comprise an unoccupied interior of a vehicle, (iii) said reference images are used as said training data for said convolutional neural network and (iv) said training data comprises said reference images from many different vehicles.

7. The apparatus according to claim 6, wherein (i) said training data is uploaded to a central source for training and (ii) results of said training are installed on said processor.

8. The apparatus according to claim 1, wherein said processor is further configured to (i) generate a vulnerability score for each of said occupants detected in said vehicle, (ii) compare said vulnerability scores for each of said occupants and (iii) rank said vulnerability of each of said occupants based on said vulnerability scores.

9. The apparatus according to claim 8, wherein said vulnerability score is determined based on a position and orientation of body parts of said occupants.

10. The apparatus according to claim 8, wherein said vulnerability score is adjustable in response to a change of a position and orientation of body parts of said occupants.

11. The apparatus according to claim 1, wherein said processor has a plurality of co-processors.

12. The apparatus according to claim 1, wherein (i) said second capture device comprises a stereo camera pair and (ii) said operations comprise performing stereo vision to determine depth information based on said video frames captured by said stereo camera pair.

13. The apparatus according to claim 1, wherein said reaction selected by said processor is implemented autonomously by said vehicle.

14. The apparatus according to claim 1, wherein reaction is selected based on a comparison between a viability of said reaction, a vulnerability of said occupants determined by said processor and a location of said occupants within said vehicle.

15. The apparatus according to claim 1, wherein said potential collision is determined to be unavoidable in response to a fusion of computer vision performed on said second video frames and an analysis of data captured by a plurality of sensors.

16. The apparatus according to claim 1, wherein said trajectory of one of said objects is determined based on an orientation and a speed of said one of said objects.

17. The apparatus according to claim 1, wherein said trajectory of one of said objects is determined based on a distance calculated between the vehicle and one of the objects.

18. The apparatus according to claim 2, wherein said computer vision operations are further performed by a convolution operation using matrix multiplication of said plurality of layers defined by said feature detection window.

19. The apparatus according to claim 18, wherein said computer vision operations are further performed by sliding said feature detection window along each of said plurality of layers.

20. A method for mitigating impact, comprising the steps of:
    generating a first plurality of video frames corresponding to an interior view of a vehicle;
    generating a second plurality of video frames corresponding to an area outside of said vehicle;
    performing operations to detect objects in (a) said first video frames and (b) said second video frames;
    detecting occupants of said vehicle based on said objects detected in said first video frames; and
    determining a likelihood of a potential collision based on said objects detected in said second video frames to (a)

continue without a reaction when said potential collision is determined to be avoidable, and (b) select a reaction when said potential collision is determined to be unavoidable, wherein said potential collision is determined by tracking a trajectory of said objects with respect to said vehicle by using a feature detection window based on neural network weight values for each of said objects extracted from a plurality of layers over a series of said plurality of said second video frames, said neural network weight values are determined in response to an analysis of training data prior to feature extraction, said reaction is selected to protect occupants determined to be vulnerable based on characteristics of said occupants, and said characteristics are determined by performing said operations on each of said occupants.

\* \* \* \* \*